(12) United States Patent
Utsumi et al.

(10) Patent No.: US 7,952,242 B2
(45) Date of Patent: May 31, 2011

(54) ROTARY ELECTRIC MACHINE INTEGRATED WITH CONTROL DEVICE

(75) Inventors: Yoshinobu Utsumi, Chiyoda-Ku (JP); Masahiko Fujita, Chiyoda-Ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 267 days.

(21) Appl. No.: 12/257,959

(22) Filed: Oct. 24, 2008

(65) Prior Publication Data
US 2009/0284106 A1    Nov. 19, 2009

(30) Foreign Application Priority Data
May 19, 2008   (JP) ................... 2008-130965

(51) Int. Cl.
*H02K 5/18*   (2006.01)
*H02K 5/20*   (2006.01)
(52) U.S. Cl. ........................ 310/64; 310/68 R
(58) Field of Classification Search ............... 310/68 R, 310/68 D, 64
See application file for complete search history.

(56) References Cited

U.S. PATENT DOCUMENTS

| | | | | |
|---|---|---|---|---|
| 6,184,600 B1 * | 2/2001 | Asao et al. | ...................... | 310/64 |
| 7,224,078 B2 * | 5/2007 | Kato et al. | ...................... | 290/31 |
| 7,423,342 B2 * | 9/2008 | Hino et al. | ...................... | 257/707 |
| 7,541,703 B2 * | 6/2009 | Uehara et al. | ............... | 310/68 D |
| 2009/0243407 A1 * | 10/2009 | Kato et al. | ....................... | 310/62 |
| 2009/0284106 A1 * | 11/2009 | Utsumi et al. | .............. | 310/68 R |

FOREIGN PATENT DOCUMENTS

| JP | 04-026346 | | 1/1992 |
|---|---|---|---|
| JP | 07-079543 | A | 3/1995 |
| JP | 07-107704 | A | 4/1995 |
| JP | 10-056760 | | 2/1998 |
| JP | 2005-102465 | | 4/2005 |
| JP | 2006-174541 | | 6/2006 |
| JP | 2007-069299 | | 3/2007 |
| JP | 2007-228641 | A | 9/2007 |
| JP | 2008-104318 | A | 5/2008 |

* cited by examiner

*Primary Examiner* — Burton Mullins
(74) *Attorney, Agent, or Firm* — Sughrue Mion, PLLC

(57) ABSTRACT

A rotary electric machine integrated with a control device includes stator current switching circuit sections, each of which has a switching element disposed on a heat sink; a field current switching circuit section; a control circuit section which controls the stator current switching circuit sections and the field current switching circuit section; and a case which contains the stator current switching circuit sections and has suction holes each for a cooling air inflow, the heat sinks of three phases for the stator current switching circuit sections being disposed in a circumferential direction of the rotary electric machine. In the rotary electric machine, of the suction holes of the case, an area of the suction hole for the heat sink of the phase disposed in the midst is set to be larger than an area of the suction hole of other phase.

5 Claims, 8 Drawing Sheets

ROTARY ELECTRIC MACHINE INTEGRATED WITH CONTROL DEVICE

BACKGROUND OF THE INVENTION

1. Field of the Invention

The present invention relates to a rotary electric machine integrated with a control device, which is integrated with a control device that performs driving control of a rotary electric machine and, more particularly, relates to a cooling structure of a stator current switching circuit section.

2. Description of the Related Art

As an example of a hitherto known rotary electric machine integrated with a control device, there is one shown in Japanese Unexamined Patent Publication No. 2007-228641. According to Japanese Unexamined Patent Publication No. 2007-228641, in a power rotary electric machine integrated with a control device including a power circuit section and a control circuit section, the control circuit section is disposed at a position where the power circuit section is not usually disposed when seen from a rotational axis direction so that the control circuit section does not block a flow of air for cooling the power circuit section and is radially outwardly shifted so as to eliminate overlap with a rotational position detecting sensor when seen from the rotational axis direction; and accordingly, cooling performance is improved.

According to the above mentioned known art, there are the following problems:

(1) Of three phase heat sinks for stator current switching circuit sections, a heat sink disposed in the midst rises to a higher temperature than that of other phase by heat transferring from both side heat sinks, and therefore, there is concern that only duration of life of a middle phase switching element is shortened;

(2) Furthermore, a heat sink disposed at a position close to a cylinder block of an engine is difficult to exhaust cooling air, because the heat sink receives heat from the cylinder block and the cylinder block is located at an outlet of the cooling air, and therefore, the heat sink is less inferior in cooling properties than other heat sink, and there is concern that only duration of life of a switching element of a phase close to the cylinder block is shortened; and (3) Besides, there is a case where an area of an exhaust hole for cooling air is influenced by a bracket mounting pad, and the area of the exhaust hole close to the bracket mounting pad becomes small; and therefore, temperature of a heat sink of a phase in which the exhaust hole is small rises to a higher temperature than that of other phase heat sink, and there is concern that only duration of life of a switching element of the temperature-risen phase is shortened.

BRIEF SUMMARY OF THE INVENTION

The present invention has been made to solve the foregoing problems of such a hitherto known device and an object of the present invention is to provide a rotary electric machine integrated with a control device which prolongs duration of life of switching elements of all phases by equalizing temperature by improving cooling performance of a heat sink of a phase disposed in the midst.

Furthermore, an object of the present invention is to provide a rotary electric machine integrated with a control device which prevents an early deterioration of a switching element of a phase close to a cylinder block by improving cooling performance of a heat sink disposed at a place close to the cylinder block of an engine.

Still furthermore, an object of the present invention is to provide a rotary electric machine integrated with a control device which prevents an early deterioration of a switching element disposed at a place where a small exhaust hole is located by improving cooling performance of a heat sink disposed at the place where the small exhaust hole is located.

A rotary electric machine integrated with a control device according to the present invention includes: a rotary electric machine which has a stator and a rotor disposed on a rotational shaft, the rotor rotating around the stator; stator current switching circuit sections, each of which has a switching element disposed on a heat sink, and energizes a stator current to the stator; a field current switching circuit section which energizes a field current to a field winding of the rotor; a control circuit section which controls the stator current switching circuit sections and the field current switching circuit section; and a case which contains the stator current switching circuit sections, and has suction holes each for a cooling air inflow to the stator current switching circuit section, the heat sinks of three phases for the stator current switching circuit sections being disposed in a circumferential direction of the rotary electric machine. In the rotary electric machine, of the suction holes of the case, an area of the suction hole for the heat sink of the phase disposed in the midst is set to be larger than an area of the suction hole for the heat sink of other phase.

Furthermore, a rotary electric machine integrated with a control device according to the present invention includes: a rotary electric machine which has a stator and a rotor disposed on a rotational shaft, the rotor rotating around the stator; stator current switching circuit sections, each of which has a switching element disposed on a heat sink, and energizes a stator current to the stator; a field current switching circuit section which energizes a field current to a field winding of the rotor; a control circuit section which controls the stator current switching circuit sections and the field current switching circuit section; and a case which contains the stator current switching circuit sections, and has suction holes each for a cooling air inflow to the stator current switching circuit section, the heat sinks of three phases for the stator current switching circuit sections being disposed in a circumferential direction of the rotary electric machine. In the rotary electric machine, of the suction holes of the case, an area of the suction hole for the heat sink of the phase disposed on the side close to a cylinder block of an engine is set to be larger than an area of the suction hole for other phase heat sink.

Still furthermore, a rotary electric machine integrated with a control device according to the present invention includes: a rotary electric machine which has a stator and a rotor disposed on a rotational shaft, the rotor rotating around the stator; stator current switching circuit sections, each of which has a switching element disposed on a heat sink, and energizes a stator current to the stator; a field current switching circuit section which energizes a field current to a field winding of the rotor; a control circuit section which controls the stator current switching circuit sections and the field current switching circuit section; and a case which contains the stator current switching circuit sections, and has suction holes each for a cooling air inflow to the stator current switching circuit section, the heat sinks of three phases for the stator current switching circuit sections being disposed in a circumferential direction of the rotary electric machine. In the rotary electric machine, of the suction holes of the case, an area of the suction hole for the heat sink of the phase in which an exhaust hole is small is set to be larger than an area of suction hole for the heat sink of other phase.

According to a rotary electric machine integrated with a control device of the present invention, cooling performance of a heat sink of a phase disposed in the midst can be improved. Therefore, temperature in respective phase heat sinks can be equalized, a rise in temperature of a middle phase switching element can be suppressed, and duration of life of all switching elements can be prolonged by equalizing temperature.

Furthermore, cooling performance of a heat sink disposed at a position close to a cylinder block of an engine can be improved, a rise in temperature of a switching element of a phase close to the cylinder block can be suppressed, and an early deterioration of the switching element can be prevented.

Still furthermore, cooling performance of a heat sink disposed at a place where small exhaust holes are located can be improved, a rise in temperature of a switching element disposed at the place of where small exhaust holes are located can be suppressed, and an early deterioration of the switching element can be prevented.

The foregoing and other object, features, and advantages of the present invention will become more apparent from the following detailed description of the preferred embodiments and description shown in drawings.

DETAILED DESCRIPTION OF THE INVENTION

Preferred Embodiment 1

Preferred embodiments according to the present invention will be described below with the drawings.

Figure 1:
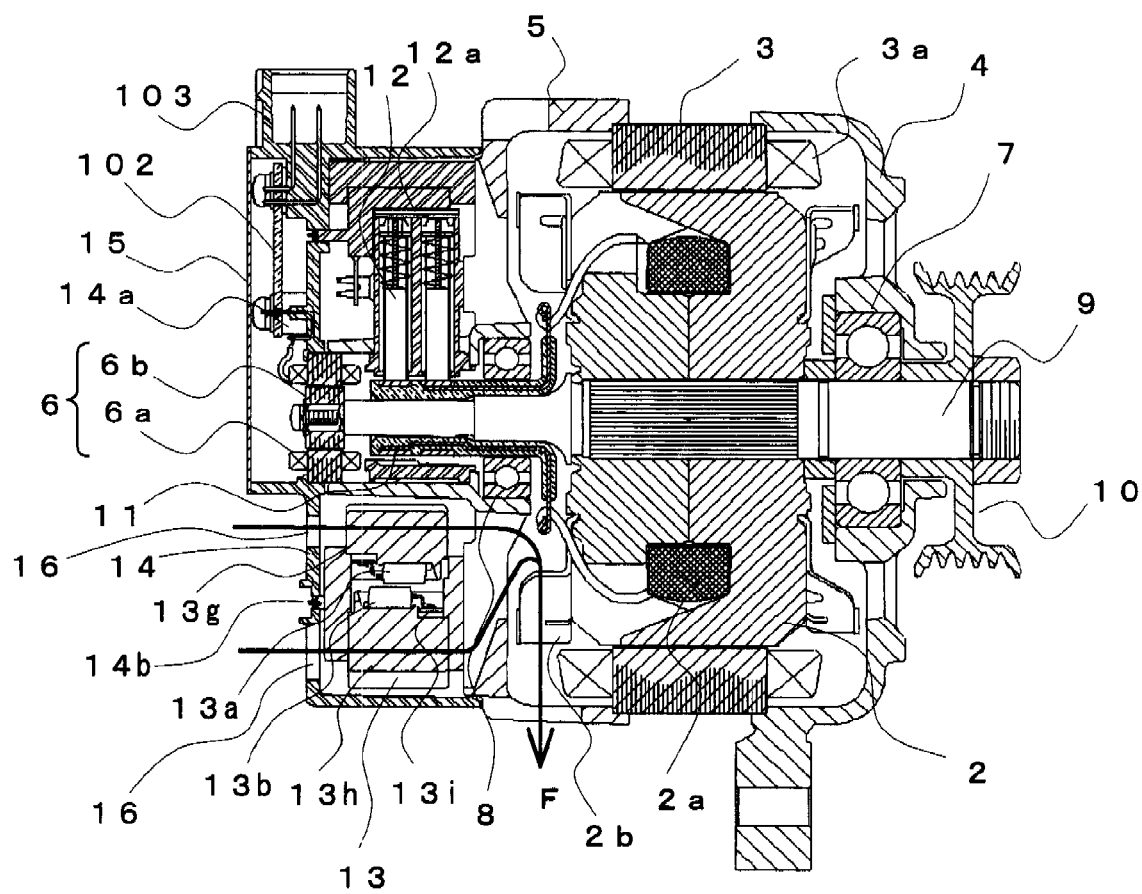
FIG. 1 is a cross-sectional view of a rotary electric machine integrated with a control device according to a preferred embodiment 1 of the present invention.
Figure 2:
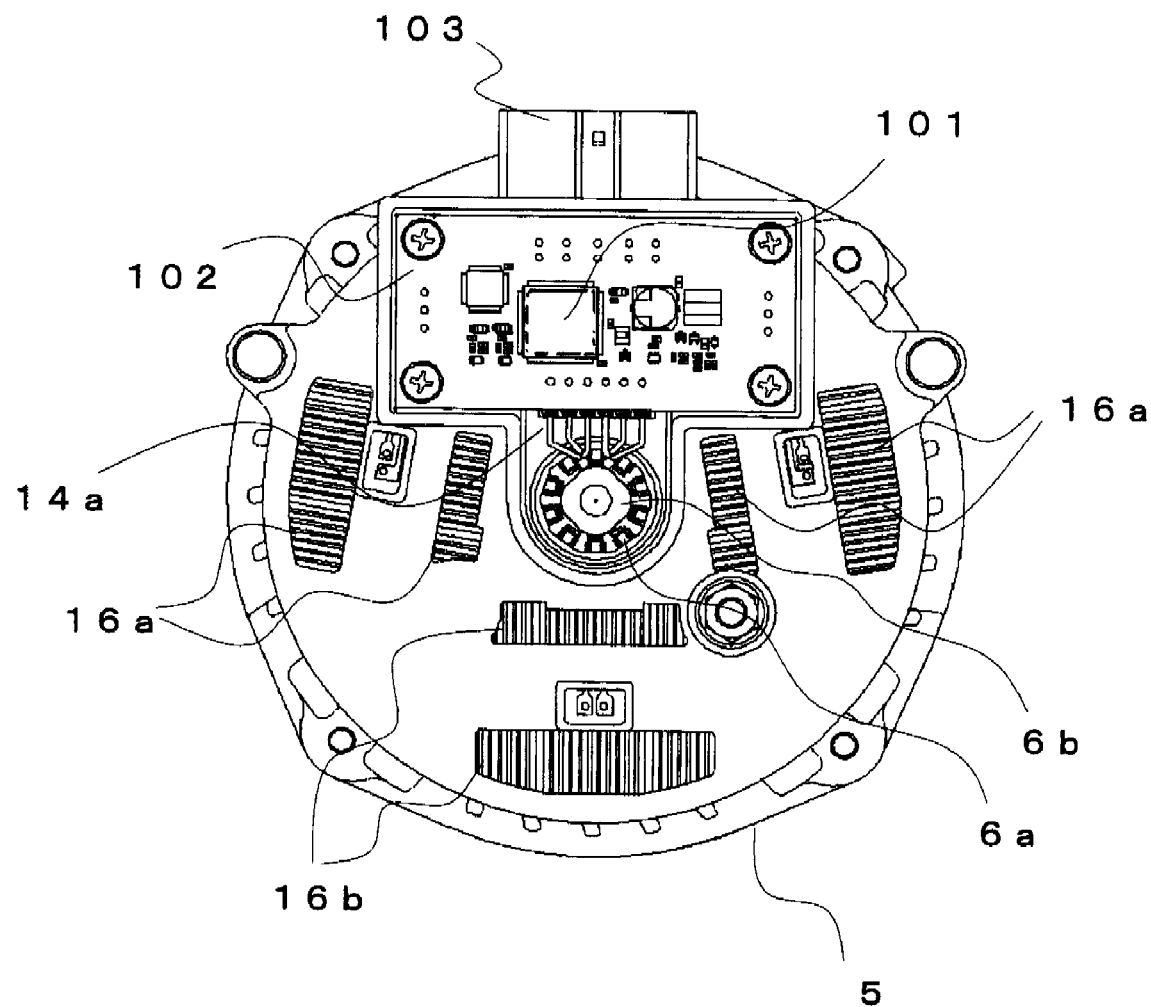
FIG. 2 is a plan view seen from the rear showing a state where a metal cover is removed in the preferred embodiment 1 of the present invention.

FIG. 1 is a cross-sectional view of a rotary electric machine integrated with a control device according to a preferred embodiment 1 of the present invention; and FIG. 2 is a plan view from the rear side of the rotary electric machine and shows a state where a metal cover 15 is removed.

In FIGS. 1 and 2, the rotary electric machine integrated with the control device includes a rotor 2 wound with a field winding 2a, a stator 3 wound with three phase stator windings 3a, a front bracket 4 and a rear bracket 5 which contain the rotor 2 and the stator 3, a magnetic pole position detecting sensor 6 which detects a rotational state of the rotor 2, and the like.

The magnetic pole position detecting sensor 6 is composed of a sensor stator 6a and a sensor rotor 6b, and the sensor rotor 6b made up of only a core is rotatably provided inside the sensor stator 6a. The sensor rotor 6b is mounted on a rotational shaft 9.

The rotor 2 is provided with a rotational shaft 9 which is rotatably supported by the front bracket 4 and the rear bracket 5 through bearings 7 and 8 at both ends thereof, respectively. The rotational shaft 9 has one end which is protruded beyond the front bracket 4 and is fixed to a pulley 10 at its tip end. Furthermore, the rotational shaft 9 has the other end which is incorporated with two slip rings 11.

The magnetic pole position detecting sensor 6 disposed outside the rear bracket 5 is coaxially disposed with the rotational shaft 9 at the other end side of the rotational shaft 9, and detects a magnetic pole position of the rotational shaft 9, that is, the rotor 2.

Brushes 12 slidably connected to the slip rings 11 are provided on the backward side of the rear bracket 5 by being held by a brush holder 12a.

UVW three phase stator current switching circuit sections 13 which are for supplying an alternating current electric power to the stator windings 3a are disposed in a circumferential direction of the rear bracket 5, and are fixed to the rear bracket 5 by blots and nuts (not shown in the drawing) which are press fitted to the rear bracket 5.

A resin case 14 is disposed on the backward side in an axial direction of the stator current switching circuit sections 13 and the brush holder 12a; and behind the case 14, the metal cover 15 which is for protecting the inside of the case is mounted. Furthermore, a connector 103 which sends and receives signals between a vehicle and the rotary electric machine is formed on the case 14 in a unified manner.

A control board (also referred to as control circuit section) 102 mounted with a microcomputer 101 which controls a motor is contained in the case 14, and the sensor stator 6a is mounted to the case 14 in a unified manner by fitting or molding. Signal lines of the sensor stator 6a are welded or soldered to terminals 14a formed to the case 14 by insert molding and are connected to the control board 102.

Each phase of the stator current switching circuit sections 13 is provided with switching elements 13a and 13b, and an internal heat sink 13g and an external heat sink 13h which also serve as electrode members to be electrically connected to the switching elements 13a and 13b. Connection between the respective switching elements 13a and 13b is performed by conductive members 13i formed to resin by insert molding and the heat sinks 13g and 13h, and is electrically connected to the control circuit section 102 by a relay connection member 14b.

A cooling fan 2b fixed to the rotor 2 produces a cooling air flow F by rotating the rotor 2. The cooling air flow F is sucked from suction holes 16 formed in the case 14, passes through heat radiation fins of the heat sinks 13g and 13h provided along a rotational axis direction, and cools the respective switching elements 13a and 13b. After that, the cooling air flow F passed through ventilating holes formed in the rear bracket 5 is radially bent at an angle of 90 degrees, and is exhausted while cooling the stator 3.

In this case, in the rotary electric machine integrated with the control device of the preferred embodiment 1 of the present invention, of the UVW three phase stator current switching circuit sections disposed in a circumferential direction of the rear bracket 5, an area of a cooling air suction hole 16b for the heat sink disposed in the midst is formed to be larger than an area of a cooling air suction hole 16a for the heat sink of other phase.

That is, the heat sink disposed in the midst rises to a higher temperature than that of other phase by heat transferring from both side heat sinks, and there is concern that only duration of life of the switching element in the middle phase is shortened.

On the other hand, according to the preferred embodiment 1 of the present invention, each of the suction holes 16a for the heat sinks on both sides formed in the case 14 is narrowed and the suction hole 16b for the heat sink in the midst is widened; and accordingly, a cooling air flow volume of the central heat sink can be larger than a cooling air flow volume of the heat sink of other phase. As a result, temperature rise in the heat sink of the phase disposed in the midst can be suppressed; and therefore, temperature in the respective phase heat sinks can be equalized and duration of life of all the switching elements can be prolonged.

Preferred Embodiment 2

A preferred embodiment 2 of the present invention will be described with reference to FIG. 3.

Figure 3:
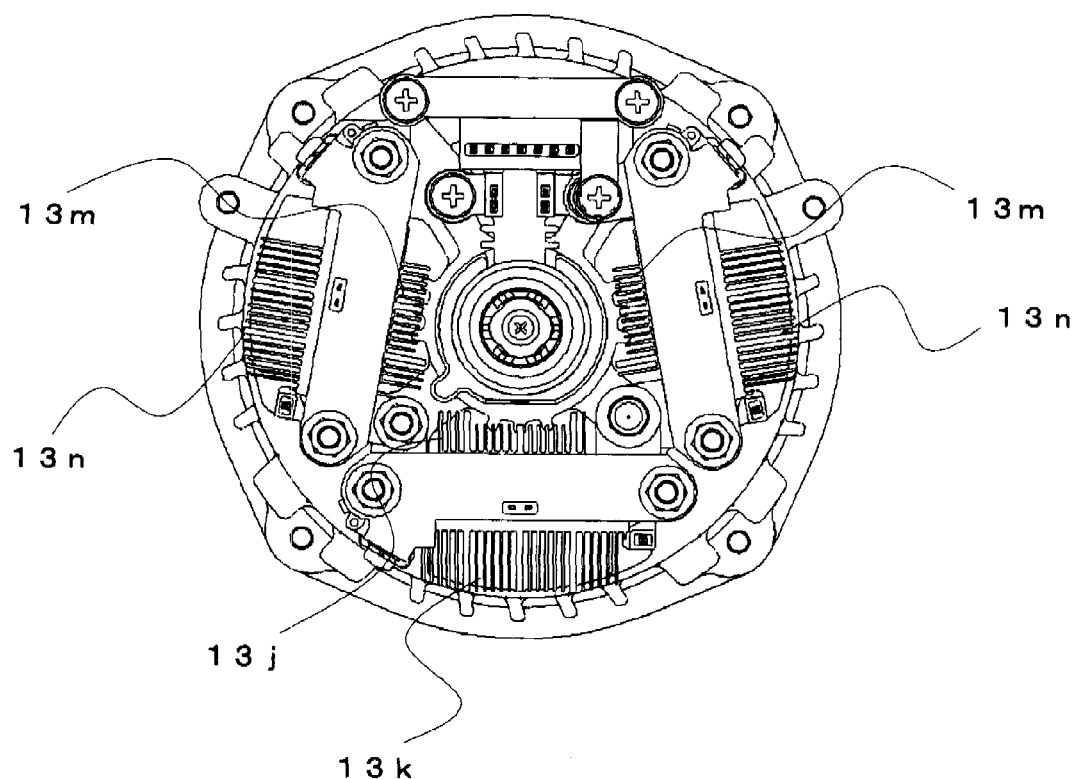
FIG. 3 is a plan view seen from the rear showing a state where a rear case is removed in a preferred embodiment 2 of the present invention.

FIG. 3 is a plan view from the rear side of a rotary electric machine showing the preferred embodiment 2 of the present invention, and showing a state where a rear case 14 is removed. In addition, a fundamental configuration of the rotary electric machine integrated with the control device is the same as that of the preferred embodiment 1 and their description will not be repeated.

In the preferred embodiment 2, the number of heat sink fins 13j and 13k disposed in the midst is set to be larger than that of heat sink fins 13m and 13n disposed on both sides.

According to the thus configured preferred embodiment 2 of the present invention, the number of the heat sink fins 13j and 13k in the midst is set to be larger than the number of each of the heat sink fins 13m and 13n on both sides; accordingly, a whole surface area of the heat sink fins 13j and 13k in the midst is made to be larger than that of other heat sink fins; and therefore, cooling performance of the heat sink of the phase disposed in the midst can be further improved than that of other phase. This can suppress a rise in temperature of the switching element in the middle phase by heat transferring from both side heat sinks and can prolong duration of life of all switching elements by equalizing temperature of the respective phase heat sinks, as in the preferred embodiment 1.

Preferred Embodiment 3

A preferred embodiment 3 of the present invention will be described with reference to FIG. 4.

Figure 4:
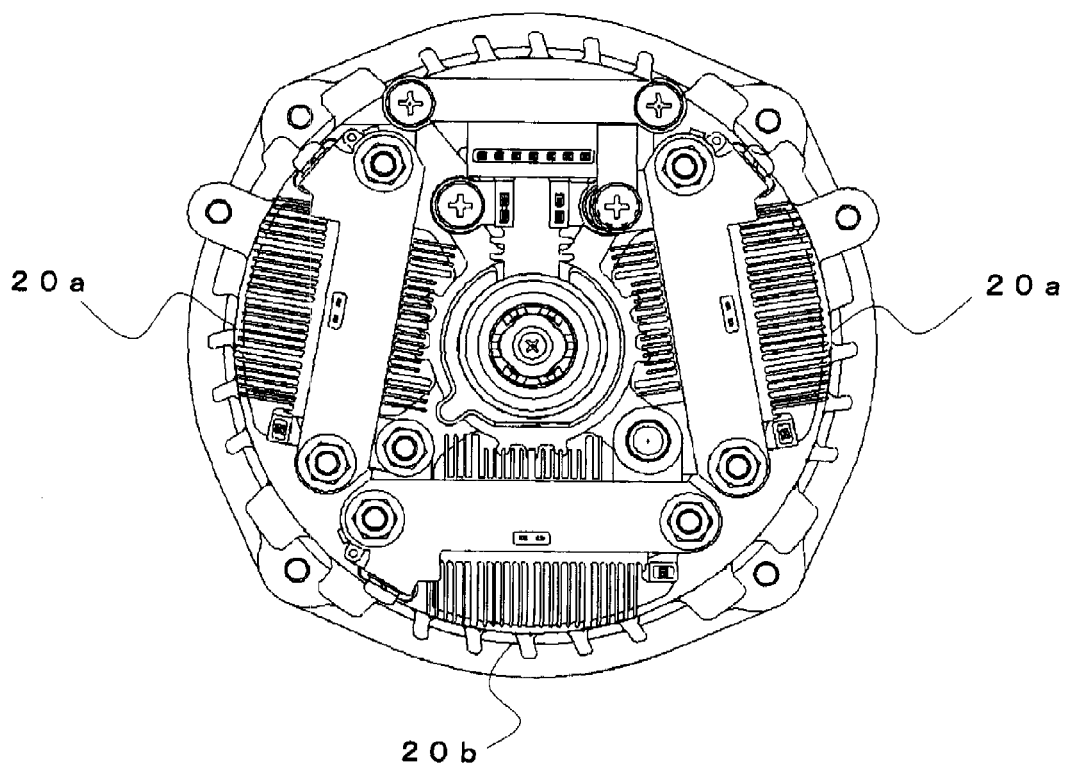
FIG. 4 is a plan view seen from the rear showing a state where a rear case is removed in a preferred embodiment 3 of the present invention.

FIG. 4 is a plan view from the rear side of a rotary electric machine showing the preferred embodiment 3 of the present invention, and showing a state where a rear case 14 is removed. In addition, a fundamental configuration of the rotary electric machine integrated with the control device is the same as that of the preferred embodiment 1 and their description will not be repeated.

In the preferred embodiment 3, an area of a cooling air exhaust hole 20b for a heat sink disposed in the midst is formed to be larger than an area of a cooling air exhaust hole 20a for a heat sink of other phase.

According to the thus configured preferred embodiment 3 of the present invention, the exhaust hole for the heat sink disposed in the center (midst) is larger than the exhaust hole of other phase; and therefore, a cooling air flow volume of the central heat sink is made to increase and cooling performance of the heat sink of the phase disposed in the midst can be further improved than cooling performance of other phase. This can equalize temperature in the respective phase heat sinks and prolong duration of life of all switching elements, as in the preferred embodiments 1 and 2.

Preferred Embodiment 4

A preferred embodiment 4 of the present invention will be described with reference to FIG. 5.

Figure 5:
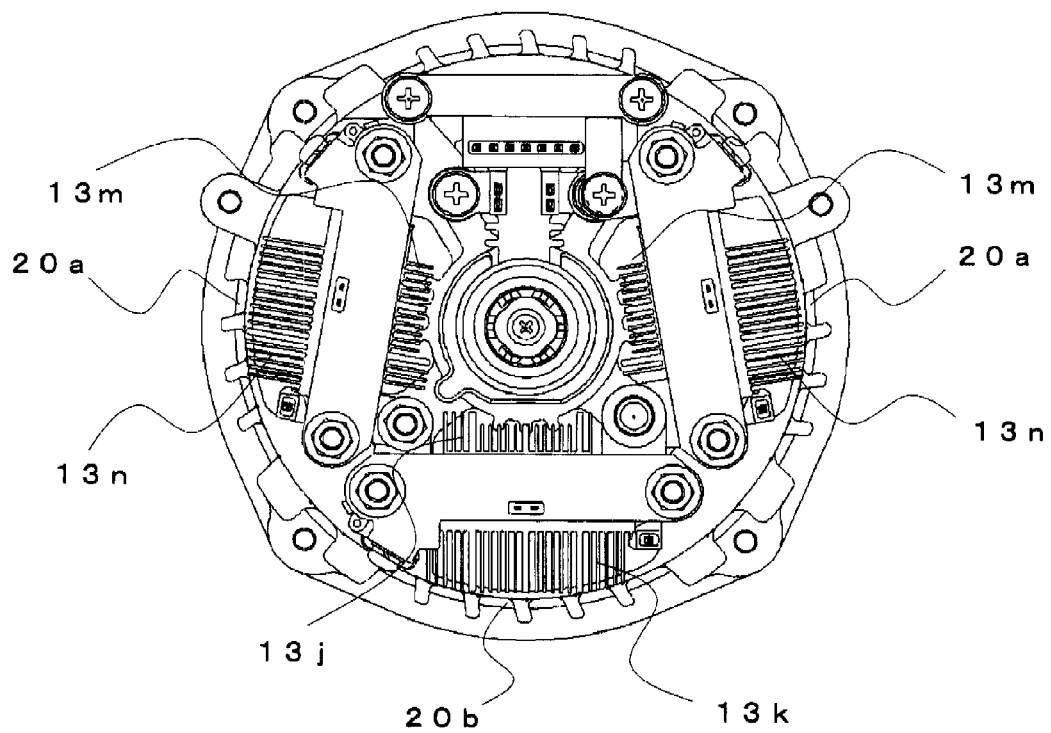
FIG. 5 is a plan view seen from the rear showing a state where a rear case is removed in a preferred embodiment 4 of the present invention.

FIG. 5 is a plan view from the rear side of a rotary electric machine showing the preferred embodiment 4 of the present invention, and showing a state where a rear case 14 is removed. In addition, a fundamental configuration of the rotary electric machine integrated with the control device is the same as that of the preferred embodiment 1 and their description will not be repeated.

The preferred embodiment 4 is one which combines the preferred embodiment 2 and the preferred embodiment 3; and as shown in FIG. 5, the number of heat sink fins 13j and 13k disposed in the midst is set to be larger than the number of each of heat sink fins 13m and 13n disposed on both sides, and an area of a cooling air exhaust hole 20b for a heat sink disposed in the midst is formed to be larger than an area of a cooling air exhaust hole 20a for a heat sink of other phase.

According to the thus configured preferred embodiment 4 of the present invention, the exhaust hole 20b for the middle heat sink is set to be larger than the exhaust hole 20a of other phase and a whole surface area of the middle heat sink fins is made to increase than that of other heat sink fins; and therefore, a cooling air flow volume and cooling performance of the central heat sink can be increased, temperature in the respective phase heat sinks can be equalized, and duration of life of all switching elements can be prolonged.

In addition, not shown in the drawing, but it is to be understood that the same effects can be exhibited by combining the preferred embodiment 1 and the preferred embodiment 2.

That is, the number of heat sink fins disposed in the midst is set to be larger than the number of each of heat sink fins disposed on both sides, and an area of a cooling air suction hole for a heat sink disposed in the midst is formed to be larger than an area of a cooling air suction hole for a heat sink of other phase; and accordingly, a cooling air flow volume and cooling performance of the central heat sink can be increased, temperature in the respective phase heat sinks can be equalized, and duration of life of all switching elements can be prolonged.

Preferred Embodiment 5

A preferred embodiment 5 of the present invention will be described with reference to FIG. 6.

Figure 6:
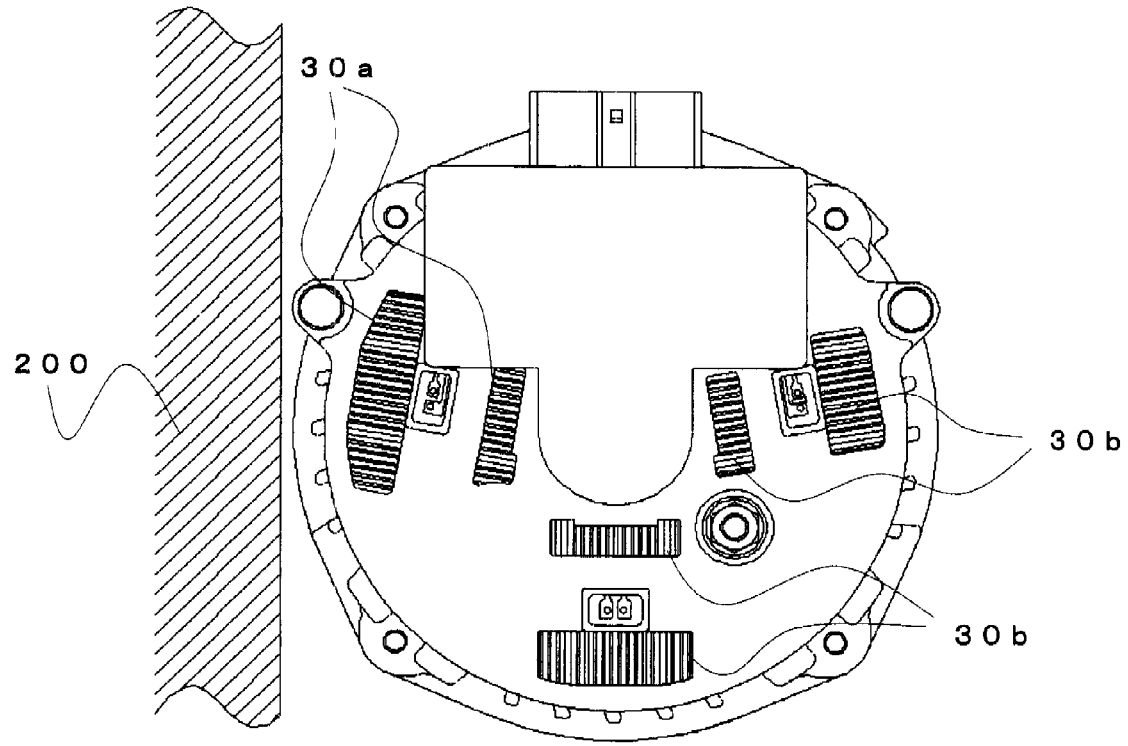
FIG. 6 is a plan view seen from the rear showing a state where a rear case is removed, and is a view showing a state being mounted to an engine block in a preferred embodiment 5 of the present invention.

FIG. 6 is a plan view from the rear side of a rotary electric machine showing the preferred embodiment 5 of the present invention, and is a view showing a state being mounted to an engine block. In addition, a fundamental configuration of the rotary electric machine integrated with the control device is the same as that of the preferred embodiment 1 and their description will not be repeated.

In the preferred embodiment 5, as shown in FIG. 6, an area of a suction hole 30a for a heat sink disposed on the side close to a cylinder block 200 of an engine is formed to be larger than an area of a suction hole 30b of other phase.

The heat sink of a phase on the side close to the cylinder block 200 of the engine is difficult to exhaust cooling air, because the heat sink receives heat from the cylinder block 200 and the cylinder block 200 is located at an outlet of the cooling air; and therefore, cooling properties of the heat sink are less inferior than that of a heat sink of other phase, and there is concern that duration of life of a switching element is shortened.

On the other hand, according to the preferred embodiment 5, the suction hole 30a for the heat sink on the side close to the cylinder block of the engine is formed to be larger; and accordingly, a cooling air flow volume can be increased, and cooling performance of the heat sink of the phase at that position can be further improved than that of other phase. Therefore, temperature in the respective phase heat sinks can be equalized, and duration of life of all switching elements can be prolonged.

Preferred Embodiment 6

A preferred embodiment 6 of the present invention will be described with reference to FIG. 7.

Figure 7:
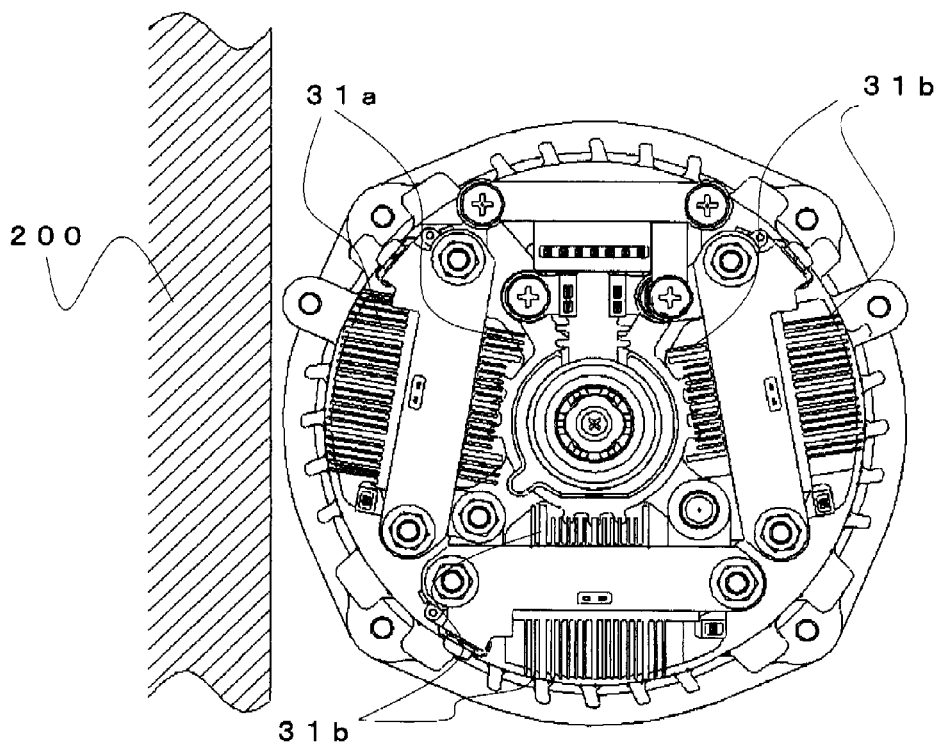
FIG. 7 is a plan view seen from the rear showing a state where a rear case is removed, and is a view showing a state being mounted to an engine block in a preferred embodiment 6 of the present invention.

FIG. 7 is a plan view from the rear side of a rotary electric machine showing the preferred embodiment 6 of the present invention, and is a view showing a state being mounted to an engine block. In addition, a fundamental configuration of the rotary electric machine integrated with the control device is the same as that of the preferred embodiment 1 and their description will not be repeated.

In the preferred embodiment 6, as shown in FIG. 7, the number of heat sink fins 31a of a heat sink disposed on the side close to a cylinder block 200 of an engine is set to be larger than that of heat sink fins 31b of other phase.

The heat sink of a phase on the side close to the cylinder block 200 of the engine is difficult to exhaust cooling air, because the heat sink receives heat from the cylinder block 200 and the cylinder block 200 is located at an outlet of the cooling air; and therefore, cooling properties of the heat sink are less inferior than that of a heat sink of other phase, and there is concern that duration of life of a switching element is shortened.

On the other hand, according to the preferred embodiment 6, the number of the heat sink fins 31a of the heat sink on the side close to the cylinder block of the engine is set to be larger than that the heat sink fins 31b of other phase; and accordingly, a whole surface area of the heat sink fins 31a is made to increase, and cooling properties of the heat sink of the phase at that position can be further improved than that of other phase. Therefore, temperature in the respective phase heat sinks can be equalized, and duration of life of all switching elements can be prolonged.

Preferred Embodiment 7

A preferred embodiment 7 of the present invention will be described with reference to FIG. 8.

Figure 8:
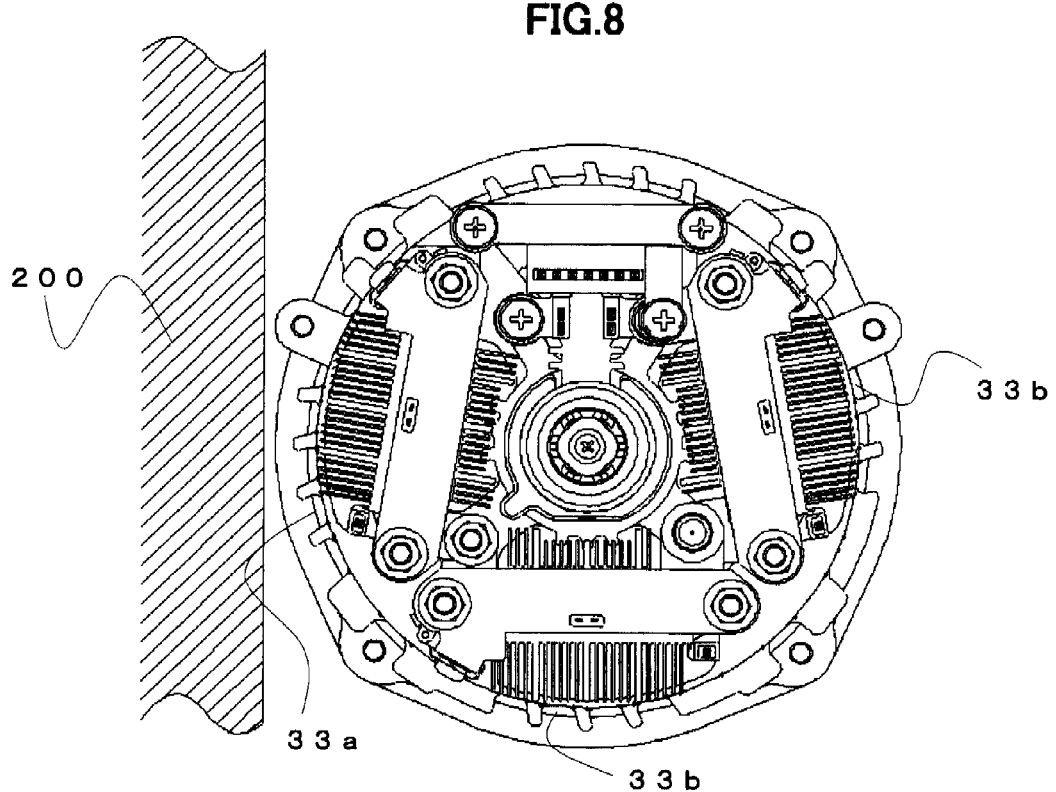
FIG. 8 is a plan view seen from the rear showing a state where a rear case is removed, and is a view showing a state being mounted to an engine block in a preferred embodiment 7 of the present invention.

FIG. 8 is a plan view from the rear side of a rotary electric machine showing the preferred embodiment 7 of the present invention, and is a view showing a state being mounted to an engine block. In addition, a fundamental configuration of the rotary electric machine integrated with the control device is the same as that of the preferred embodiment 1 and their description will not be repeated.

In the preferred embodiment 7, as shown in FIG. 8, an area of cooling air exhaust holes 33a for a heat sink disposed on the side close to a cylinder block 200 of an engine is formed to be larger than an area of an exhaust hole 33b of other phase.

According to the thus configured preferred embodiment 7 of the present invention, an area of the cooling air exhaust hole 33a for the heat sink on the side close to a cylinder block 200 is set to be larger than that of the exhaust hole 33b of other phase; and accordingly, a cooling air flow volume of the heat sink is made to increase and cooling performance of the heat sink of the phase at that position can be further improved than that of other phase. Therefore, temperature in the respective phase heat sinks can be equalized and duration of life of all switching elements can be prolonged.

Preferred Embodiment 8

A preferred embodiment 8 of the present invention will be described with reference to FIGS. 9 and 10.

Figure 9:
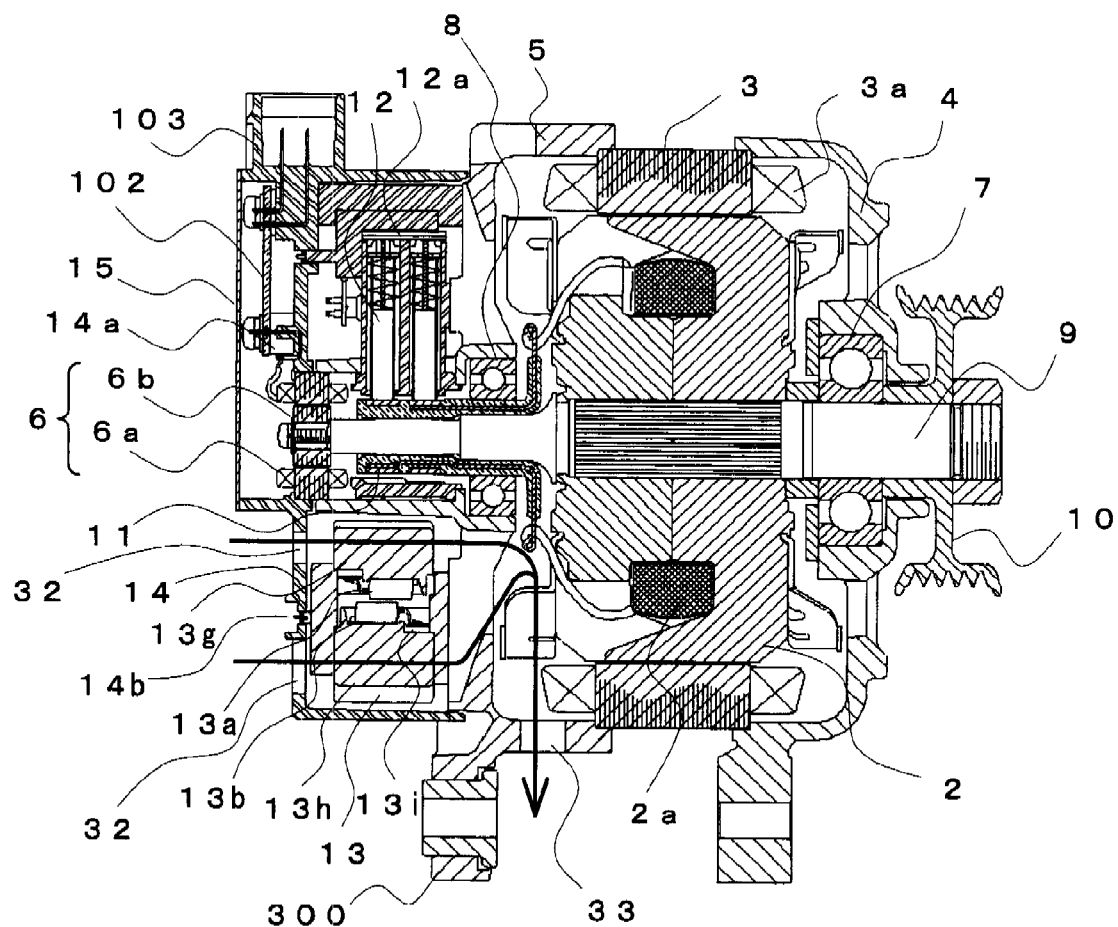
FIG. 9 is a cross-sectional view of a rotary electric machine integrated with a control device showing a preferred embodiment 8 of the present invention.

FIG. 9 is a cross-sectional view of a rotary electric machine integrated with a control device according to a preferred embodiment 8 of the present invention; FIG. 10 shows a plan view from the rear side of the rotary electric machine; and the same reference numerals are given to those identical to constitutional elements or similar elements in the preferred embodiment 1. Furthermore, a fundamental configuration of the rotary electric machine integrated with the control device is the same as that of the preferred embodiment 1 and their description will not be repeated.

Figure 10:
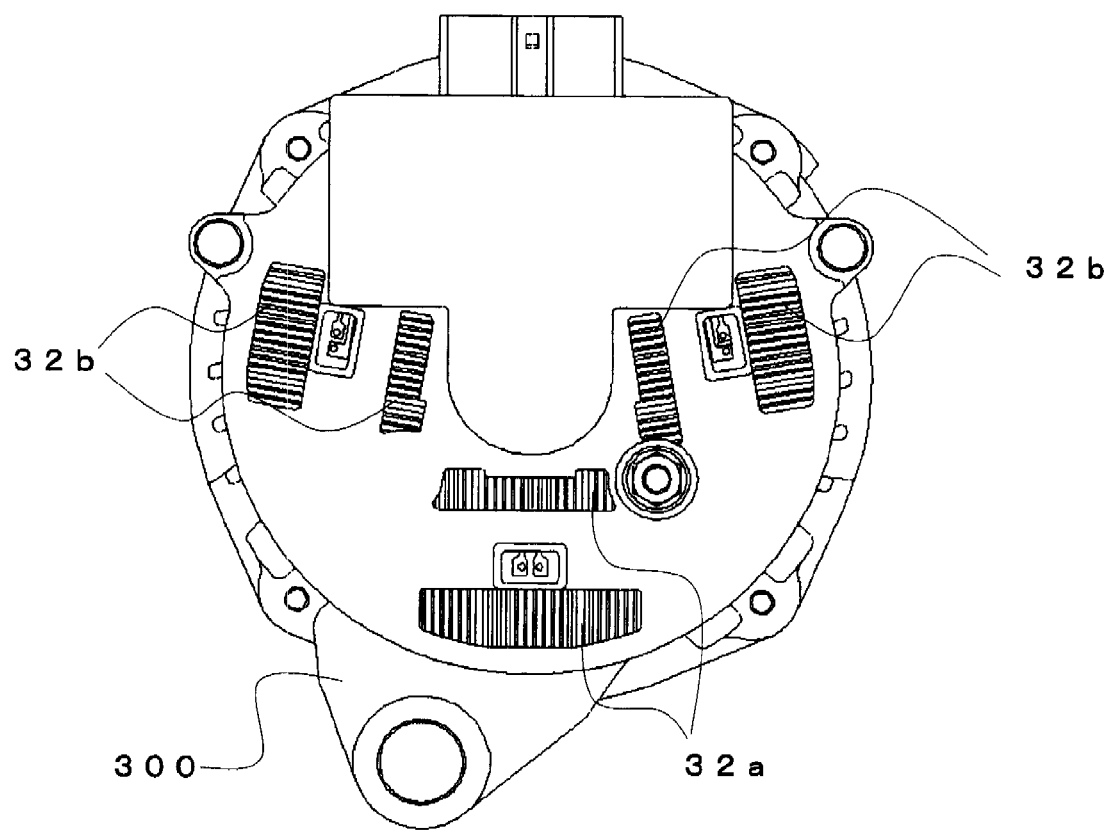
FIG. 10 is a plan view seen from the rear showing the preferred embodiment 8 of the present invention.

In the preferred embodiment 8, as is apparent from FIG. 10, an area of a cooling air suction hole 32a for a heat sink disposed in the vicinity of a mounting pad 300 of a rear bracket 5 is formed to be larger than an area of a suction hole 32b for a heat sink of other phase.

In the rotary electric machine integrated with the control device, the mounting pad 300 is provided on the rear bracket 5, an area of cooling an air exhaust hole 33 for a heat sink of a phase where the bracket mounting pad 300 is disposed becomes smaller; and accordingly, the heat sink of its phase reduces a cooling air flow volume, becomes to a higher temperature than that of a heat sink of other phase, and there is concern that duration of life of a switching element is shortened.

On the other hand, according to the preferred embodiment 8, an area of the cooling air suction hole 32a for the heat sink of a phase at a place where the bracket mounting pad 300 is disposed is set to be larger than that of the suction hole 32b of other phase; and accordingly, a cooling air flow volume is made to increase and cooling performance of the heat sink of the phase at that position can be further improved than that of other phase. Therefore, temperature in the respective phase heat sinks can be equalized and duration of life of all switching elements can be prolonged.

Preferred Embodiment 9

A preferred embodiment 9 of the present invention will be described with reference to FIG. 11.

Figure 11:
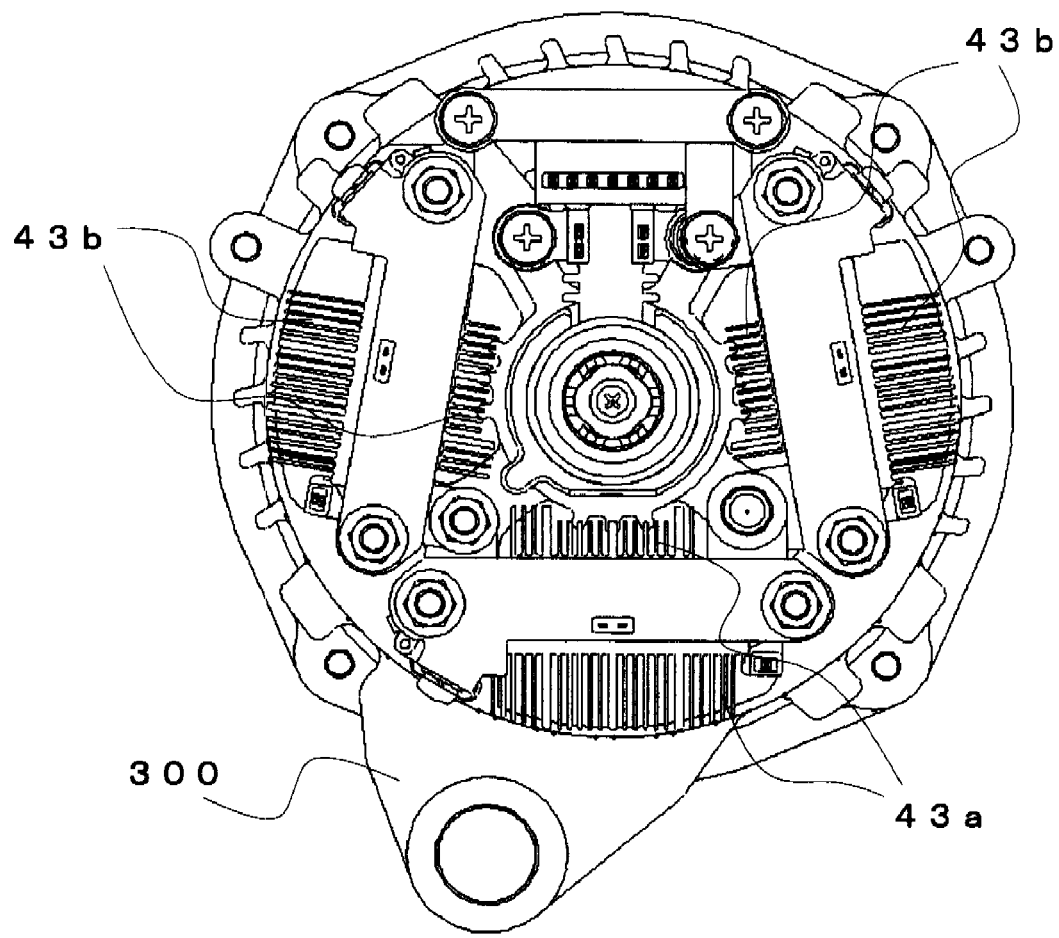
FIG. 11 is a plan view seen from the rear showing a state where a rear case is removed in a preferred embodiment 9 of the present invention.

FIG. 11 is a plan view from the rear side of a rotary electric machine showing the preferred embodiment 9 of the present invention. In addition, a fundamental configuration of the rotary electric machine integrated with the control device is the same as that of the preferred embodiment 8 and their description will not be repeated.

In the preferred embodiment 9, as shown in FIG. 11, the number of heat sink fins 43*a* of a heat sink disposed on the side close to a mounting pad 300 of a rear bracket 5 is set to be larger than that of heat sink fins 43*b* of other phase.

According to the thus configured preferred embodiment 9, the number of the heat sink fins 43*a* of a phase where the bracket mounting pad 300 is disposed is set to be larger than that of the heat sink fins 43*b* of other phase; and accordingly, a whole surface area of the heat sink fins 43*a* is made to increase and cooling performance of a phase at that position can be further improved than that of other phase. Therefore, temperature in the respective phase heat sinks can be equalized and duration of life of all switching elements can be prolonged.

What is claimed is:

1. A rotary electric machine integrated with a control device, comprising:
   a rotary electric machine which has a stator and a rotor disposed on a rotational shaft, the rotor rotating around the stator;
   stator current switching circuit sections, each of which has a switching element disposed on a heat sink, and energizes a stator current to the stator;
   a field current switching circuit section which energizes a field current to a field winding of the rotor;
   a control circuit section which controls the stator current switching circuit sections and the field current switching circuit section; and
   a case which contains the stator current switching circuit sections, and has suction holes each for a cooling air inflow to the stator current switching circuit section,
   the heat sinks of three phases for the stator current switching circuit sections being disposed in a circumferential direction of the rotary electric machine from the control circuit section,
   wherein, of the three phase heat sinks for the stator current switching circuit sections, a whole surface area of fins of the heat sink of the middle phase is set to be larger than that of the other two phases.

2. The rotary electric machine integrated with the control device according to claim 1,
   wherein an area of an exhaust hole of the heat sink of the middle phase is set to be larger than an area of an exhaust hole for the other two phases.

3. A rotary electric machine integrated with a control device, comprising:
   a rotary electric machine which has a stator and a rotor disposed on a rotational shaft, the rotor rotating around the stator;
   stator current switching circuit sections, each of which has a switching element disposed on a heat sink, and energizes a stator current to the stator;
   a field current switching circuit section which energizes a field current to a field winding of the rotor;
   a control circuit section which controls the stator current switching circuit sections and the field current switching circuit section; and
   a case which contains the stator current switching circuit sections, and has suction holes each for a cooling air inflow to the stator current switching circuit section,
   the heat sinks of three phases for the stator current switching circuit sections being disposed in a circumferential direction of the rotary electric machine from the control circuit section,
   wherein, of the suction holes of the case, an area of the suction hole for the heat sink of the middle phase is set to be larger than an area of the suction hole for the heat sink of the other two phases, and
   wherein a whole surface area of fins of the heat sink of the middle phase is set to be larger than that of the other two phases.

4. A rotary electric machine integrated with a control device, comprising:
   a rotary electric machine which has a stator and a rotor disposed on a rotational shaft, the rotor rotating around the stator;
   stator current switching circuit sections, each of which has a switching element disposed on a heat sink, and energizes a stator current to the stator;
   a field current switching circuit section which energizes a field current to a field winding of the rotor;
   a control circuit section which controls the stator current switching circuit sections and the field current switching circuit section; and
   a case which contains the stator current switching circuit sections, and has suction holes each for a cooling air inflow to the stator current switching circuit section,
   the heat sinks of three phases for the stator current switching circuit sections being disposed in a circumferential direction of the rotary electric machine,
   wherein, of the three phase heat sinks for the stator current switching circuit sections, a whole surface area of fins for the heat sink of the phase disposed on the side close to a cylinder block of an engine is set to be larger than that of the other two phases.

5. A rotary electric machine integrated with a control device, comprising:
   a rotary electric machine which has a stator and a rotor disposed on a rotational shaft, the rotor rotating around the stator;
   stator current switching circuit sections, each of which has a switching element disposed on a heat sink, and energizes a stator current to the stator;
   a field current switching circuit section which energizes a field current to a field winding of the rotor;
   a control circuit section which controls the stator current switching circuit sections and the field current switching circuit section; and
   a case which contains the stator current switching circuit sections, and has suction holes each for a cooling air inflow to the stator current switching circuit section,
   the heat sinks of three phases for the stator current switching circuit sections being disposed in a circumferential direction of the rotary electric machine,
   wherein, of the three phase heat sinks for the stator current switching circuit sections, a whole surface area of fins of the heat sink of the phase in which an exhaust hole is small is set to be larger than that of the other two phases.

* * * * *